US007113521B2

(12) United States Patent
Miller et al.

(10) Patent No.: US 7,113,521 B2
(45) Date of Patent: Sep. 26, 2006

(54) APPARATUS AND METHOD FOR RE-SENDING DATA ON COMMUNICATION CHANNELS

(76) Inventors: Michael J. Miller, 258 E. 1640 N., Pleasant Grove, UT (US) 84062; Eric R. Southam, 824 W. 900 N., Pleasant Grove, UT (US) 84062; Grant W. Dearden, P.O. Box 173, Henefer, UT (US) 84033

( * ) Notice: Subject to any disclaimer, the term of this patent is extended or adjusted under 35 U.S.C. 154(b) by 1134 days.

(21) Appl. No.: 09/803,422

(22) Filed: Mar. 9, 2001

(65) Prior Publication Data

US 2002/0126682 A1 Sep. 12, 2002

(51) Int. Cl.
*H04L 12/26* (2006.01)
(52) U.S. Cl. ...................... 370/474; 370/489
(58) Field of Classification Search ............. 370/535, 370/536, 542, 543, 544, 428, 480, 415, 470, 370/474, 489; 709/237
See application file for complete search history.

(56) References Cited

U.S. PATENT DOCUMENTS 4,984,190 A * 1/1991 Katori et al. ............... 709/237
5,461,622 A * 10/1995 Bleickardt et al. .......... 370/470
6,625,161 B1 * 9/2003 Su et al. ..................... 370/415

* cited by examiner

Primary Examiner—Melvin Marcelo
(74) Attorney, Agent, or Firm—Knobbe Martens Olson & Bear LLP

(57) ABSTRACT

A multi-channel transmission system that provides dynamic mapping of data to channels is described. In one embodiment, a packet of data to be transmitted is broken up into a number of fragments. Fragments are loaded into transmit buffers. Active buffers are indicated by bits in an active-fragment register and active channels are indicated by bits in an active-channel register. A transmit buffer to channel mapping is provided by multiplexers. The multiplexers are controlled by a channel mapping table that uses the data in the active-fragment register and the active-channel register to decide which transmit buffers are mapped to which channels. Each transmit buffer can be simultaneously mapped to more than one channel in order to allow the same data to be simultaneously transmitted on more than one channel, thereby increasing the likelihood that the data will be successfully transmitted even if some of the channels are rendered inoperative. In one embodiment, an acknowledgement sent by a receiver indicates which channels are operative and which channels are inoperative.

26 Claims, 5 Drawing Sheets

APPARATUS AND METHOD FOR RE-SENDING DATA ON COMMUNICATION CHANNELS

FIELD OF THE INVENTION

The present invention relates to techniques for managing retransmission of lost data on a multi-channel communication system.

BACKGROUND OF THE INVENTION

The widespread availability of computers and communication devices (e.g. cellular telephones) has generated a rapid increase in the number of data networks. Networking two or more computers together allows the computers to share information, file resources, printers, etc. Connecting two or more computers together to form a network is, in principle, a simple task. The computers are simply connected together using a cable, and the necessary software is installed onto the computers. In network terminology, the cable is the network medium and the computers and printers are the network nodes. Unfortunately, in practice, creating a computer network is often not quite as simple as it sounds.

The electrical signal environment of a network medium typically limits the maximum speed at which data can be transmitted over the medium. The maximum speed is generally limited by the maximum bandwidth available on the medium and the noise (or more precisely, the signal to noise ratio) encountered on the medium. While the bandwidth of the medium is usually quite predictable, the noise (and thus the signal to noise ratio) can be unpredictable. Typical noise sources include motors, switching transients, ElectroMagnetic Interference, and the like. Noise-like sources can also include electrical discontinuities in the medium. Electrical discontinuities such as and connectors, cable bends, impedance variations, and the like, create reflections that interfere with data transmission.

In multi-channel systems, where the medium supports multiple independent channels, the changing characteristics of noise on the line can create situations where data sent on some channels is successfully received at the destination node while data on other channels (bad channels) is lost. Systems that retransmit lost data, that is, data bad channels, can suffer from excess system complexity, cost, and/or slow data throughput due to the overhead and latency associated with setting up the transmitter to retransmit lost data.

SUMMARY OF THE INVENTION

The present invention solves these and other problems by providing a network physical layer that allows multiple nodes to communicate digital data at high speed, with low error rates, using multiple channels. Data from multiple transmit buffers can be arbitrarily mapped into one or more channels in an efficient, low-cost, manner that provides very low latency and high probability of successful transmission even when some of the channels are corrupted by time-changing noise that temporarily and unpredictably renders some channels unusable.

In one embodiment, multiple channels are multiplexed onto a single medium. The channels can be separated by time, frequency, code, etc. The use of multiple channels provides higher aggregate data rates (greater throughput) during time periods when the noise and noise-like interference on the medium permits the use of several channels. The use of multiple independent channels also provides higher reliability, and lower error rates, especially during time periods when the noise and noise-like interference on the medium prohibits the use of one or more of the channels.

In one embodiment the physical layer provides multiple channels by using Frequency Division Multiplexing (FDM). Each FDM channel is independent and separately modulated to carry data. In one embodiment, each FDM channel is modulated using Differential Binary Phase Shift Keying (DBPSK) or Differential Quadrature Phase Shift Keying (DQPSK). DBPSK and DQPSK are relatively robust in the presence of noise and provide relatively low error rates. In one embodiment, orthogonal FDM (OFDM) is used.

In one embodiment, a packet of data to be transmitted is broken up into a number of fragments. In one embodiment, the maximum length of a fragment is chosen such that when the fragment is transmitted, the transmission time of the fragment will not exceed an expected "quiet" period on the channel. In one embodiment, given N fragments and M channels (where N is greater than M) fragments n . . . n+M are transmitted on channels 1 . . . M to a receiver. The receiver examines the received fragment on each channel and determines which packets were received successfully (i.e. received without an uncorrectable error), corresponding to good channels, and which packets were not received successfully (i.e., received with an uncorrectable error), corresponding to bad channels. The receiver sends an acknowledgement to the transmitter indicating which channels were good and which channels were bad. In one embodiment the acknowledgement includes a bitmask having one bit per channel. The bits of the bitmask are coded to indicate good channels and bad channels.

In one embodiment, the transmitter, upon receiving the acknowledgement from the receiver, retransmits fragments from the group n . . . n+M that were not successfully received by the receiver. Upon retransmission, if there are fewer fragments than channels, the transmitter duplicates fragments to fill out all the channels. In one embodiment, once all of the fragments in the set of fragments n . . . n+M has been successfully transmitted (and acknowledged) the transmitter proceeds to the set of fragments n+M+1 . . . n+2M+1.

In one embodiment, the medium is an electrical powerline, such as the 110-volt electrical wiring in a house or office. In one embodiment, the medium is a telephone line. In one embodiment, the medium is a radio-frequency transmission band.

BRIEF DESCRIPTION OF THE DRAWINGS

Aspects, features, and advantages of the present invention will be more apparent from the following particular description thereof presented in conjunction with the following drawings, wherein.

Figure 1:
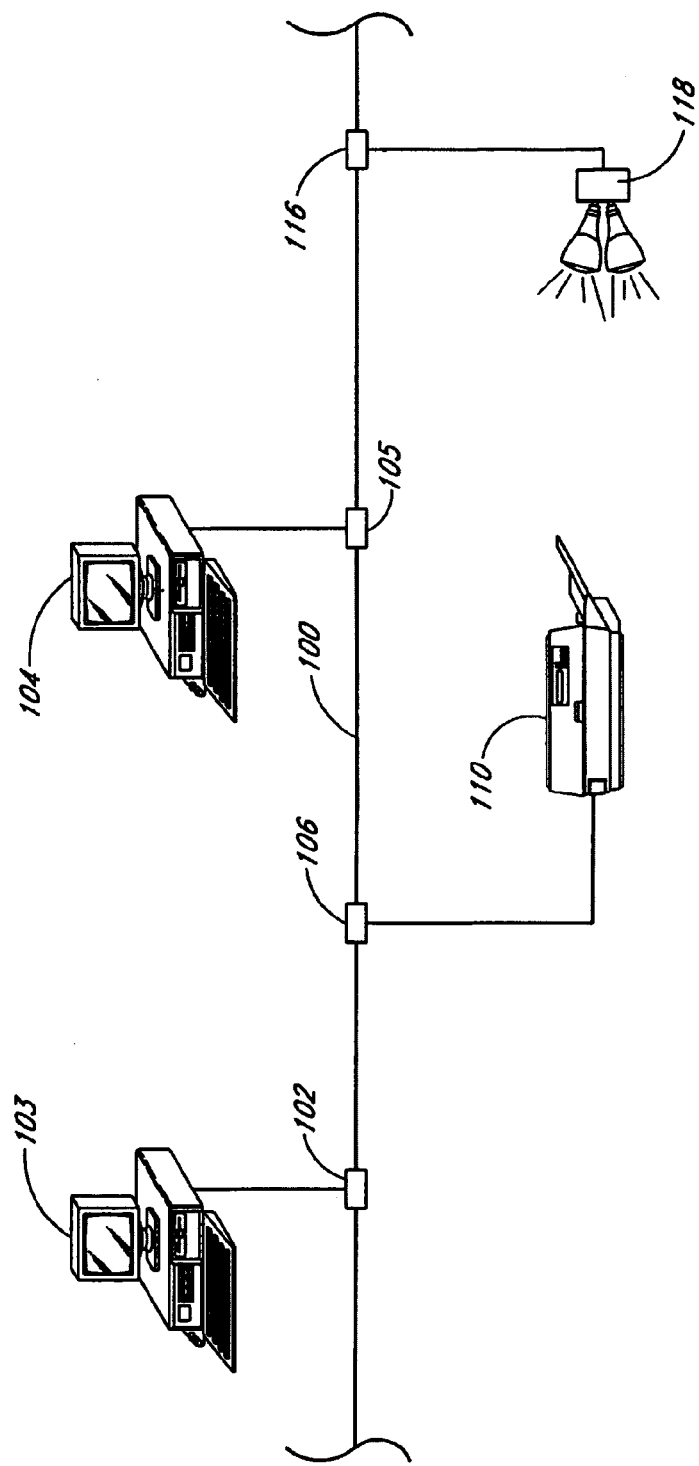
FIG. 1 is a schematic diagram of a typical data network showing the network medium.

In the drawings, the first digit of any three-digit reference number generally indicates the number of the figure in which the referenced element first appears.

DETAILED DESCRIPTION

FIG. 1 shows a typical computer network having a network medium 100 (shown as a cable). A computer 103 is connected to the network medium 100 by a connector 102. A printer 110, a computer 104 and a lighting system 118 are also connected to the network medium 100. The lighting system 118 is a typical example of a node that has relatively little computing power or storage but that communicates over the network so that the lighting system 118 can be controlled by other devices on the network. Network-controlled devices such as the lighting system 118 are typical of home or office automation devices, internet-appliances, and the like. The network medium can be any form of transmission medium including, for example, a Radio Frequency (RF) communication channel, a coaxial cable, a twisted-pair cable, a fiber-optic cable, a telephone line, a 110-volt power line, a high-voltage power line, etc.

Each device that communicates over the medium 100 typically includes a network transceiver having a transmitter for sending data on the network medium 100 and a receiver for receiving data from the network 100. In many cases, the network medium is a multi-channel medium that supports multiple communication channels. Such channels can be separated from each other by, for example, Frequency Division Multiplexing (FDM), Time Division Multiplexing (TDM), and/or Code Division Multiplexing (CDM). The channels can be used separately to allow simultaneous communication between several devices attached to the medium 100, or the channels can be aggregated to allow higher data throughput than what is possible with a single channel.

Figure 2:
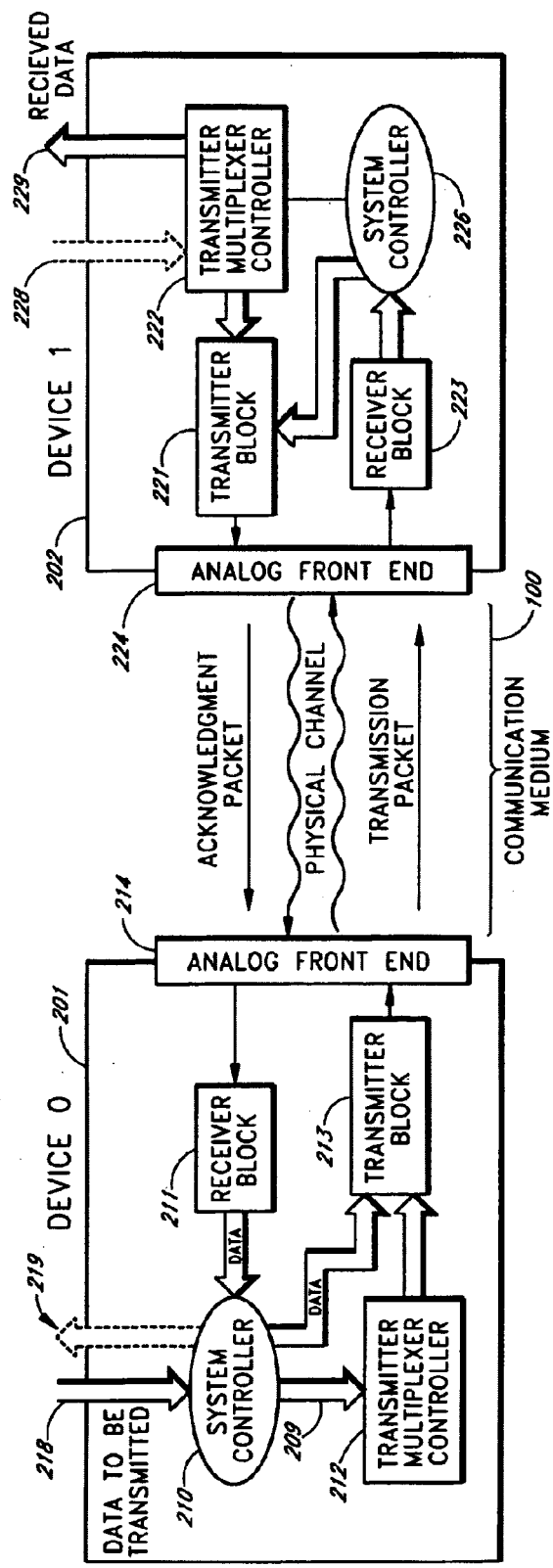
FIG. 2 is a block diagram showing a multi-channel communication system that includes a first multi-channel transceiver, a multi-channel medium, and a second multi-channel transceiver.

FIG. 2 is a block diagram showing a multi-channel communication system that includes a first multi-channel transceiver 201, the multi-channel medium 100, and a second multi-channel transceiver 202. The transceivers 201–202 are representative of network transceivers found in network-attached devices such as, for example, the computers 103–104, the printer 110, and the light system 118. The transceivers 201–202 are also representative of transceivers found in other communication equipment, such as, for example, cellular telephones, two-way radios, modems, and the like. The transceivers 201–202 need not be identical in construction, but are typically similar enough in function in order to allow the transceivers 201–202 to communication with each other.

In FIG. 2, the transceiver 201 includes a system controller 210, a receiver block 211, a transmitter block 213, a transmitter-multiplexer controller 212, and a front end 214. In one embodiment, the front end 214 is an analog front end that provides signal access to and from the communications medium. Data to be transmitted by the transceiver 201 is provided to an input data port 218, and data received by the transceiver 201 is provided at a output data port 219. One skilled in the art will recognize that the input data port 218 and the output data port 219 can be combined into a bi-directional data port. A data output of the front end 214 is provided to a data input of the receiver block 211. A data output of the receiver block 211 is provided to a received-data input of the system controller 210. A transmit-data output of the system controller 210 is provided to a transmit-data input of the transmitter block 213. A multiplexer control output from the system controller 210 is provided to the transmitter multiplexer controller 212, and a multiplexer-address output from the multiplexer controller 212 is provided to a multiplexer-address input of the transmitter block 212.

The transceiver 202 is similar to the transceiver 201, and includes a system controller 226 a receiver block 221, a transmitter block 223, a transmitter-multiplexer controller 222, and a front end 224. Organization and data flow in the transceiver 202 is similar to the transceiver 201, wherein the system controller 226 the receiver block 221, the transmitter block 223, the transmitter-multiplexer controller 222, and the front end 224 correspond to the system controller 210, the receiver block 211, the transmitter block 213, the transmitter-multiplexer controller 212, and the front end 214, respectively.

In the explanations that follow, it is assumed that the transceiver 201 is sending data (received on the input data port 218) to the to the transceiver 202 (where the data appears at the output data port 229).

The M channels on the medium 100 can be separated by frequency (as in frequency division multiplexing), time (as in time division multiplexing), code (as in code division multiplexing), combinations of frequency, time, and code, and other multiplexing methods. The medium 100 can also be implemented as multiple physical channels, such as, for example, multiple coaxial cables, multiple twisted pairs, multiple fiber optic cables, etc. On the medium 100, a particular channel may be blocked or not capable of transferring data for a period of time due to effects such as, for example, noise, interference, reflections, standing waves, etc. The blocked status of a particular channel will typically change over time, such that a channel that is blocked for a period of time will typically become unblocked at a later time. Data (i.e. fragments) that are transmitted on a blocked channel will be lost in transmission and will not be received by the destination node and thus it is desirable to provide a protocol for retransmission of lost fragments using channels that are not blocked. In one embodiment, lost packets are dynamically remapped to channels that are expected to be unblocked and retransmitted.

As shown in FIG. 2, each network device typically includes a system controller, a receiver block and a transmitter block. The system controllers 210, 226 coordinate the process of transmitting and receiving data between devices. Consider, for example, the transmission of a packet from the transceiver 201 to the transceiver 202. The packet is provided to the system controller 210 where it is broken up into one or more fragments. The system controller 210 provides the first M fragments to the transmitter block 213 which then sends the M fragments on M channels (one fragment per channel) to the receiver block 223.

The system controller 226 determines which, if any, channels did not successfully transfer data across the communication medium 100. The system controller 226 prepares an acknowledge packet that indicates which channels were good (corresponding to received fragments) and which channels were bad (corresponding to lost fragments). In one embodiment, the acknowledge packet includes a bitmap (also know as a bitmask or mask) where each bit is asserted to indicate a good channel, and not asserted to indicate a bad channel. The system controller 226 sends the acknowledge packet to the transmitter block 221 and configures the multiplexer controller 222 (described in more detail below) to transmit the acknowledge packet on all M channels, thereby providing a relatively high likelihood that the acknowledge packet will be received by the receiver block 211.

The receiver block 211 receives the acknowledge packet (assuming that at least one of the channels is good) and provides the acknowledge packet to the system controller 210. The system controller 210 uses the good/bad channel information in the acknowledge packet to determine which fragments were lost and thus need to be resent. The system controller then sends commands to the multiplexer controller 212 to map the lost fragments onto the good channels and then instructs the transmitter block 213 to retransmit the lost fragments. This process is repeated until all fragments have been successfully sent and acknowledged. Once the first M fragments (that is, the fragments 1 . . . M) have been successfully sent, then the system controller 210 selects the next M fragments (that is, the fragments M+1 . . . 2M) for transmission. This process is repeated until all fragments in the packet have been successfully transmitted and acknowledged.

Figure 3:
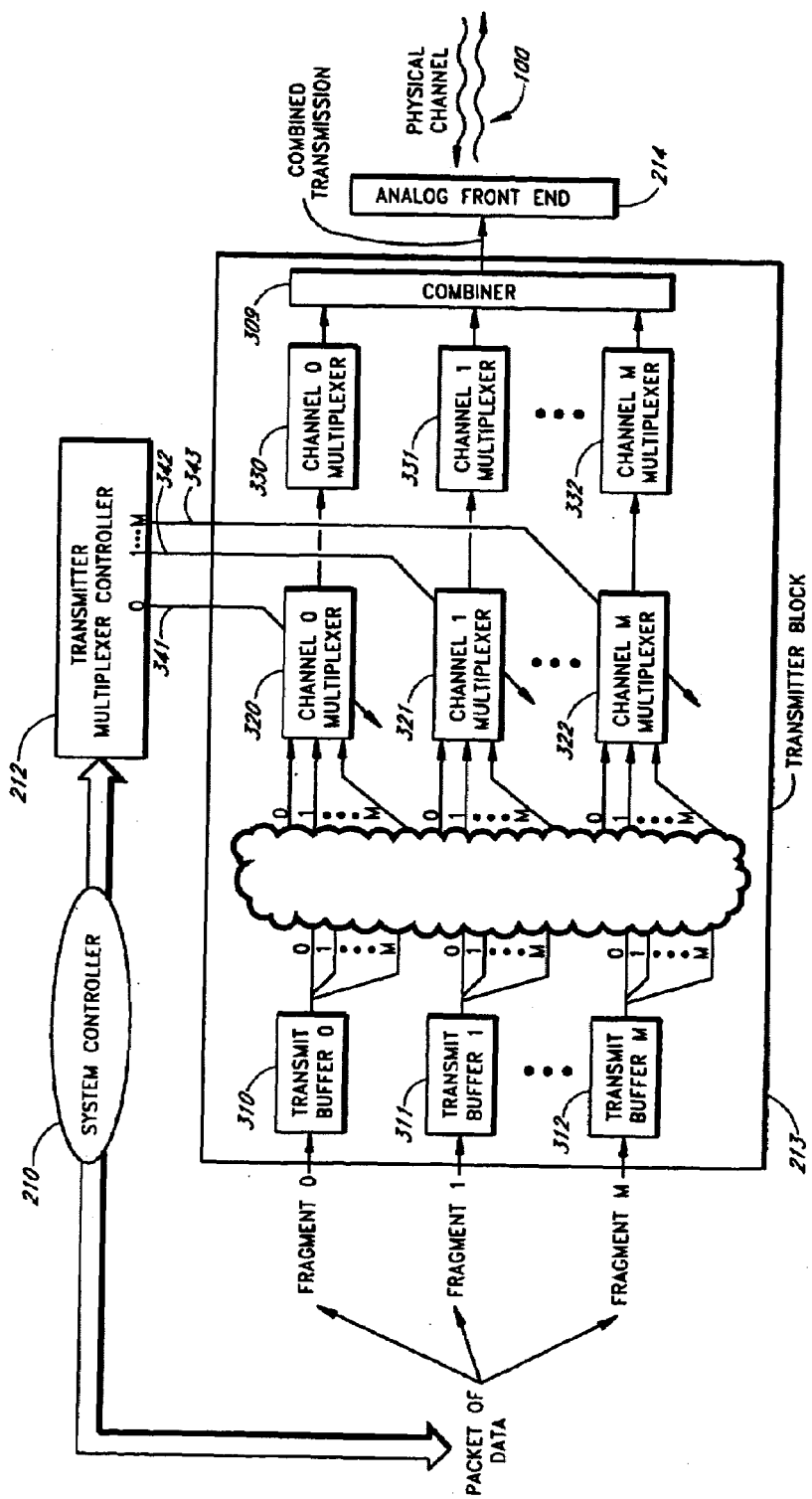
FIG. 3 is a block diagram showing a multi-channel transmitter that maps transmit buffers to channel transmitters.

FIG. 3 is a block diagram showing of the multi-channel transmitter block 213. The transmitter block 213 maps M transmit buffers 310–312 to M transmitters 330–332 by using M multiplexers 320–322. Each of the multiplexers 320–322 has M data inputs and 1 output data. Each of the multiplexers 320–322 also has a control input. An address on the control input of the multiplexer determines which of the M inputs is mapped to the output of each multiplexer. A first address bus 341 is provided by the multiplexer controller 212 to the multiplexer 320. A second address bus 342 is provided by the multiplexer controller 212 to the multiplexer 321 by a path 342. An $M^{th}$ address bus 343 is provided by the multiplexer controller 212 to the $M^{th}$ multiplexer 322.

The output of the multiplexer 320 is provided to a data input of the transmitter 330, and a data output from the transmitter 330 is provided to a first input of a combiner 309. The output of the multiplexer 321 is provided to a data input of the transmitter 331, and a data output from the transmitter 331 is provided to a second input of the combiner 309. The output of the multiplexer 322 is provided to a data input of the transmitter 332, and a data output from the transmitter 332 is provided to an $M^{th}$ input of the combiner 309. An output of the combiner 309 is provided to the front end 214.

Data to be transmitted is provided by the system controller 210 to the transmit buffers 310–312. In one embodiment, a packet of data is broken up into a number of fragments. Each one of the buffers 310–312 is configured to hold a fragment. If there are more fragments than data buffers 310–312 (that is, if there are more than M fragments) then the extra fragments are sent at a later time. For example, if a packet is broken up into N fragments, then fragments 1 through M are first loaded into the buffers 310–312 to be transmitted. Once fragments 1 through M have been successfully transmitted to the receiver, then fragments M+1 through 2M are loaded into the transmit buffers 310–312.

Figure 4:
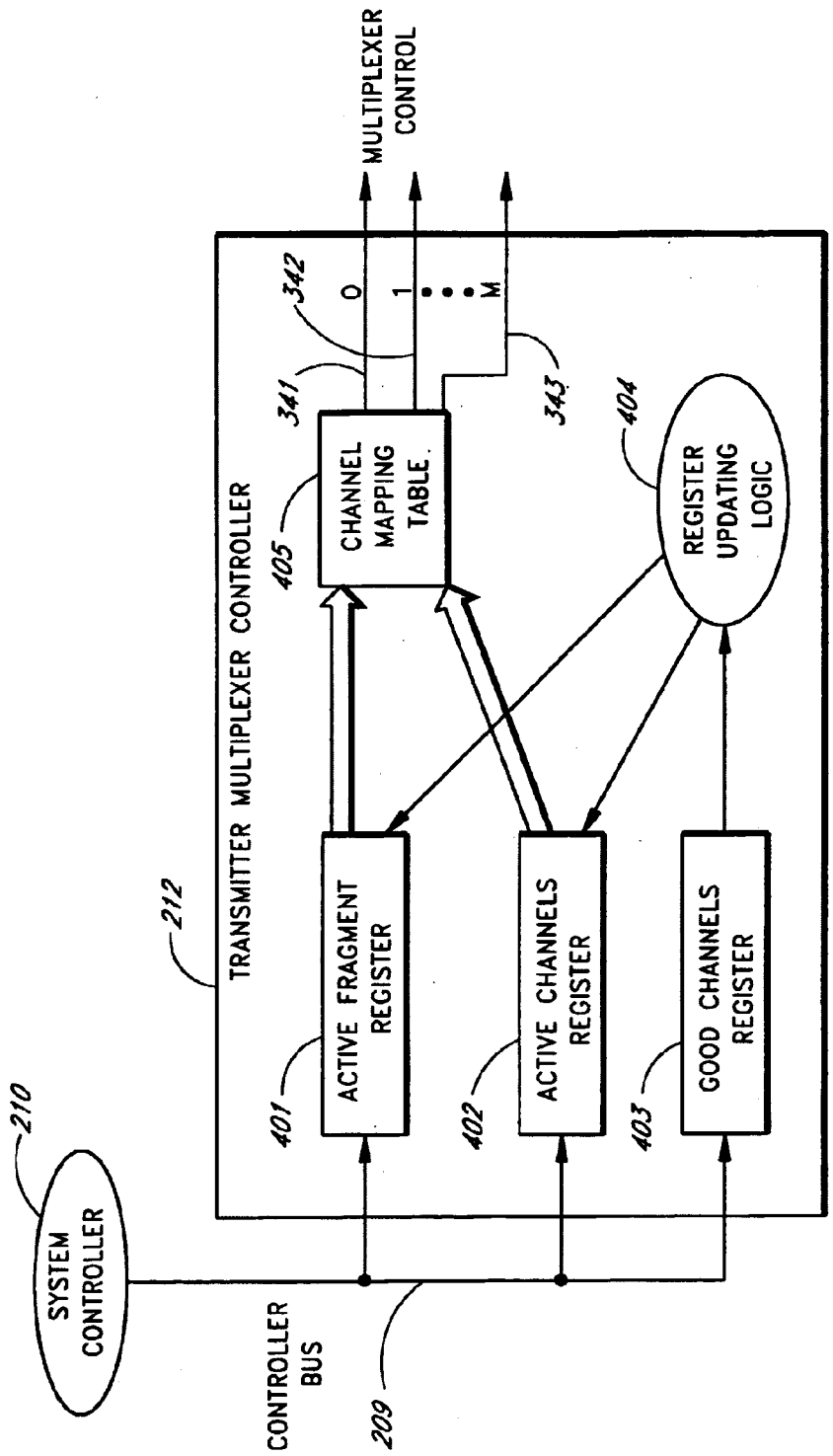
FIG. 4 is a block diagram showing a transmitter multiplexer controller for the multi-channel transmitter shown in FIG. 3.

FIG. 4 is a block diagram of the multiplexer controller 212. The multiplexer controller 212 includes an active-fragment register 401, an active-channel register 402, a good-channel register 403, register update logic 404, and a channel-mapping table 405. The control bus 209 is provided to an input of the active-fragment register 401, to an input of the active-channel register 402, and to an input of the good-channel register 403. An output of the active-fragment register 401 is provided to an active fragment input of the channel-mapping table 405.

The active-fragment register 401 provides a flag (e.g., one bit) for each transmit buffer 310–312. When the system controller 210 loads a fragment into one of the transmit buffers 310–312 to indicate that the transmit buffer contains a fragment to be transmitted. Each filled transmit buffer is called an active fragment. When a group of M new packets is loaded into the transmit buffers 310–312, the system controller 210 also initializes the active-channel register 402 with a bit mask, where each bit asserted corresponds to a channel that is expected to transmit successfully. This initialization occurs prior to the first transmission for each group of fragments. The packet is then sent and the acknowledgement packet is received as described in connection with FIG. 2. From the acknowledgement packet, the system controller 210 determines which channels were good and which channels were bad. Each bit (or flag) in the good channel register 403 corresponds to a channel and the system controller asserts bits in the good channel register 403 corresponding to channels that the acknowledgement packet indicates as being good. Using the data from the good channel register 403, the register update logic 404 updates the active-channel register 402 to reflect the good channels and the active-fragment register 401 to show which fragments have been successfully transmitted (and are therefore inactive) and which fragments have not been successfully transmitted (and are therefore still active).

The multiplexer controller 212 uses the channel-mapping table 405 to map active fragments to active channels according to the values in the active-fragment register 401 and the active-channel register 402. For convenience, the channel-mapping table 405 is described herein as a lookup table. However, one of ordinary skill in the art will recognize that the channel-mapping table 405 can be implemented using a lookup table, as gate logic, as a logic array, etc. The outputs 342–343 of the channel-mapping table 405 control the operation of the multiplexers 320–322. Each multiplexer has M inputs (corresponding to the transmit buffers 310–312) and one output. The output of each multiplexer is provided to one of the channel transmitters 330–332. Thus, by controlling the multiplexers 320–322, the channel-mapping table 405 can map any transmit buffer 310–312 to any channel transmitter 330–332. For example, the channel-mapping table 405 can map transmit buffers 310–312 to channel transmitters 330–332 on a one-to-one basis. The channel-mapping table 405 can just as easily map any one of the transmit buffers 310–312 to all of the channel transmitters 330–332.

Usually, only the active transmit buffers (that is, the buffers for which the corresponding bit is asserted in the active-fragment register 401) will be mapped to the channel transmitters 330–332. In other words, typically, the inactive transmit buffers (that is, the buffers for which the corresponding bit in the active-fragment register 401 is not asserted) will not be selected by any of the multiplexers 320–322. In one embodiment, the channel-mapping table 405 attempts to increase the likelihood that fragments will be successfully transmitted. Thus, for example, the channel-mapping table will first map the active buffers to the active channels. If there are more active channels than active buffers, the channel-mapping table 405 will then also map some of the active buffers to unused active channels and/or to the inactive channels (bad channels) just in case a bad channel becomes operative and a good channel goes bad (as can happen, for example, when the characteristics of the noise on the medium 100 change). This means that the same data (the same transmit buffer) can be mapped to more than one channel. The receiving transceiver 202 discards any unneeded fragments it receives (thus if it receives three copies of the same fragment on different channels, it will keep one and discard the other two).

Appendix A lists a complete fragment-to-channel mapping table for one embodiment of a four-channel system that provides a high level of performance. The columns of Appendix A labeled "Active Fragments" correspond to bits in a four-bit active-fragment register. There are 16 groups (groups 0–15) of active fragment combinations. The columns of Appendix A labeled "Active Channels" correspond to bits in a four-bit active-channel register. The columns of Appendix A labeled "Fragment Mapping" correspond to multiplexer addresses for the four multiplexers in a four-channel system.

Appendix B lists an alternate embodiment of a complete fragment to channel-mapping table for a four-channel system. The embodiment in Appendix B provides a slightly lower level of performance than the list in Appendix A (that is, the mapping in Appendix B does not use the available channels quite as efficiently as the mapping in Appendix A). However, the mapping in Appendix B can be implemented with fewer gates than the mapping in Appendix A. Thus, while the mapping in Appendix B would typically be less attractive when the mapping table 405 is implemented as a lookup table, the mapping in Appendix B is less expensive when the mapping table 405 is implemented using logic gates.

Figure 5:
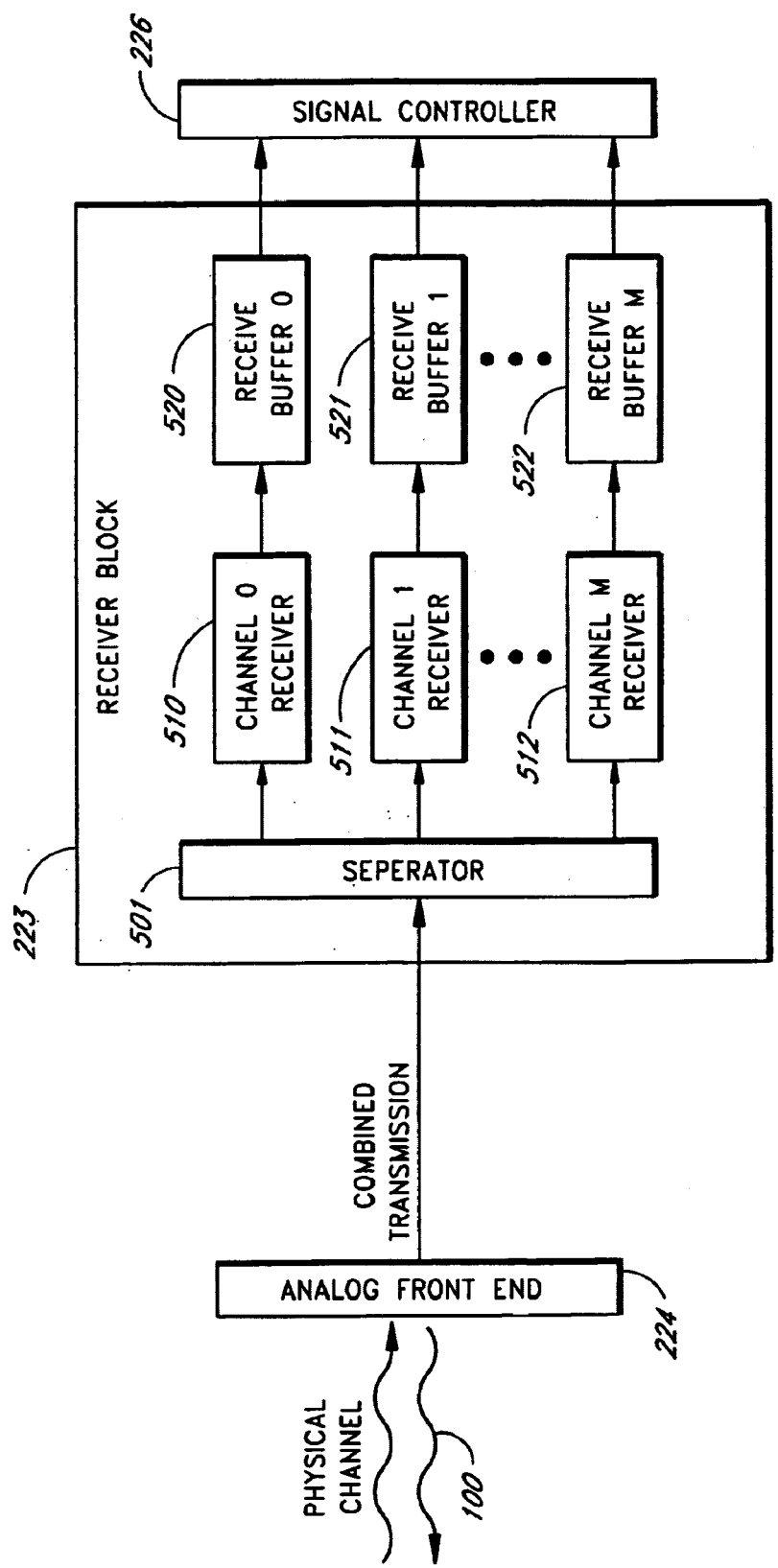
FIG. 5 is a block diagram showing a multi-channel receiver.

FIG. 5 is a block diagram showing one embodiment of the multi-channel receiver block 223. The multi-channel receiver block 223 receives combined channel data from the front end 224. Data from the front end 224 is provided to a channel separator 501 where the combined data is separated into M channels. A first channel output from the separator 501 is provided to an input of a first channel receiver 510. A second channel output from the separator 501 is provided to an input of a second channel receiver 511. An $M^{th}$ channel output from the separator 501 is provided to an input of an $M^{th}$ channel receiver 512. Outputs from the receivers 510–512 are provided to inputs of receiver buffers 520–522 respectively. Outputs from the receiver buffers 520–522 are provided to the system controller 226.

Through the foregoing description and accompanying drawings, the present invention has been shown to have important advantages over current medium networking systems. While the above detailed description has shown, described, and pointed out the fundamental novel features of the invention, it will be understood that various omissions and substitutions and changes in the form and details of the device illustrated may be made by those skilled in the art, without departing from the spirit of the invention. For example, while the mapping tables described herein are provided for four-channels, it will be obvious to one of ordinary skill in the art that the described system can be used with any number of two or more channels. Moreover, the number of channels (and therefore the number of channel transmitters) can be different than (larger than or less than) the number of transmit buffers. The term "asserted" used here can refer to active-high logic (where a "1" means active), and/or active-low logic (where a "0" means active). Therefore, the invention should be limited in its scope only by the following claims.

Appendix A

| Group | Active Fragments | | | | Active Channels | | | | Fragment Mapping | | | |
|---|---|---|---|---|---|---|---|---|---|---|---|---|
| | 3 | 2 | 1 | 0 | 3 | 2 | 1 | 0 | Ch 3 | Ch 2 | Ch 1 | Ch 0 |
| 0 | 0 | 0 | 0 | 0 | 0 | 0 | 0 | 0 | 0 | 0 | 0 | 0 |
| | | | | | 0 | 0 | 0 | 1 | 0 | 0 | 0 | 0 |
| | | | | | 0 | 0 | 1 | 0 | 0 | 0 | 0 | 0 |
| | | | | | 0 | 0 | 1 | 1 | 0 | 0 | 0 | 0 |
| | | | | | 0 | 1 | 0 | 0 | 0 | 0 | 0 | 0 |
| | | | | | 0 | 1 | 0 | 1 | 0 | 0 | 0 | 0 |
| | | | | | 0 | 1 | 1 | 0 | 0 | 0 | 0 | 0 |
| | | | | | 0 | 1 | 1 | 1 | 0 | 0 | 0 | 0 |
| | | | | | 1 | 0 | 0 | 0 | 0 | 0 | 0 | 0 |
| | | | | | 1 | 0 | 0 | 1 | 0 | 0 | 0 | 0 |
| | | | | | 1 | 0 | 1 | 0 | 0 | 0 | 0 | 0 |
| | | | | | 1 | 0 | 1 | 1 | 0 | 0 | 0 | 0 |
| | | | | | 1 | 1 | 0 | 0 | 0 | 0 | 0 | 0 |
| | | | | | 1 | 1 | 0 | 1 | 0 | 0 | 0 | 0 |
| | | | | | 1 | 1 | 1 | 0 | 0 | 0 | 0 | 0 |
| | | | | | 1 | 1 | 1 | 1 | 0 | 0 | 0 | 0 |
| 1 | 0 | 0 | 0 | 1 | 0 | 0 | 0 | 0 | 0 | 0 | 0 | 0 |
| | | | | | 0 | 0 | 0 | 1 | 0 | 0 | 0 | 0 |
| | | | | | 0 | 0 | 1 | 0 | 0 | 0 | 0 | 0 |
| | | | | | 0 | 0 | 1 | 1 | 0 | 0 | 0 | 0 |
| | | | | | 0 | 1 | 0 | 0 | 0 | 0 | 0 | 0 |
| | | | | | 0 | 1 | 0 | 1 | 0 | 0 | 0 | 0 |
| | | | | | 0 | 1 | 1 | 0 | 0 | 0 | 0 | 0 |
| | | | | | 0 | 1 | 1 | 1 | 0 | 0 | 0 | 0 |
| | | | | | 1 | 0 | 0 | 0 | 0 | 0 | 0 | 0 |
| | | | | | 1 | 0 | 0 | 1 | 0 | 0 | 0 | 0 |
| | | | | | 1 | 0 | 1 | 0 | 0 | 0 | 0 | 0 |
| | | | | | 1 | 0 | 1 | 1 | 0 | 0 | 0 | 0 |
| | | | | | 1 | 1 | 0 | 0 | 0 | 0 | 0 | 0 |
| | | | | | 1 | 1 | 0 | 1 | 0 | 0 | 0 | 0 |
| | | | | | 1 | 1 | 1 | 0 | 0 | 0 | 0 | 0 |
| | | | | | 1 | 1 | 1 | 1 | 0 | 0 | 0 | 0 |
| 2 | 0 | 0 | 1 | 0 | 0 | 0 | 0 | 0 | 1 | 1 | 1 | 1 |
| | | | | | 0 | 0 | 0 | 1 | 1 | 1 | 1 | 1 |
| | | | | | 0 | 0 | 1 | 0 | 1 | 1 | 1 | 1 |
| | | | | | 0 | 0 | 1 | 1 | 1 | 1 | 1 | 1 |
| | | | | | 0 | 1 | 0 | 0 | 1 | 1 | 1 | 1 |
| | | | | | 0 | 1 | 0 | 1 | 1 | 1 | 1 | 1 |
| | | | | | 0 | 1 | 1 | 0 | 1 | 1 | 1 | 1 |

| | | | | | | | | | | | | |
|---|---|---|---|---|---|---|---|---|---|---|---|---|
| | | | | | 0 | 1 | 1 | 1 | 1 | 1 | 1 | 1 |
| | | | | | 1 | 0 | 0 | 0 | 1 | 1 | 1 | 1 |
| | | | | | 1 | 0 | 0 | 1 | 1 | 1 | 1 | 1 |
| | | | | | 1 | 0 | 1 | 0 | 1 | 1 | 1 | 1 |
| | | | | | 1 | 0 | 1 | 1 | 1 | 1 | 1 | 1 |
| | | | | | 1 | 1 | 0 | 0 | 1 | 1 | 1 | 1 |
| | | | | | 1 | 1 | 0 | 1 | 1 | 1 | 1 | 1 |
| | | | | | 1 | 1 | 1 | 0 | 1 | 1 | 1 | 1 |
| | | | | | 1 | 1 | 1 | 1 | 1 | 1 | 1 | 1 |
| 3 | 0 | 0 | 1 | 1 | 0 | 0 | 0 | 0 | 0 | 0 | 1 | 0 |
| | | | | | 0 | 0 | 0 | 1 | 1 | 1 | 0 | 0 |
| | | | | | 0 | 0 | 1 | 0 | 1 | 1 | 0 | 0 |
| | | | | | 0 | 0 | 1 | 1 | 0 | 0 | 1 | 0 |
| | | | | | 0 | 1 | 0 | 0 | 0 | 0 | 1 | 0 |
| | | | | | 0 | 1 | 0 | 1 | 1 | 1 | 0 | 0 |
| | | | | | 0 | 1 | 1 | 0 | 1 | 1 | 0 | 0 |
| | | | | | 0 | 1 | 1 | 1 | 0 | 0 | 1 | 0 |
| | | | | | 1 | 0 | 0 | 0 | 0 | 1 | 1 | 0 |
| | | | | | 1 | 0 | 0 | 1 | 1 | 0 | 0 | 0 |
| | | | | | 1 | 0 | 1 | 0 | 1 | 0 | 0 | 0 |
| | | | | | 1 | 0 | 1 | 1 | 0 | 1 | 1 | 0 |
| | | | | | 1 | 1 | 0 | 0 | 0 | 1 | 1 | 0 |
| | | | | | 1 | 1 | 0 | 1 | 1 | 0 | 0 | 0 |
| | | | | | 1 | 1 | 1 | 0 | 1 | 0 | 0 | 0 |
| | | | | | 1 | 1 | 1 | 1 | 0 | 1 | 1 | 0 |
| 4 | 0 | 1 | 0 | 0 | 0 | 0 | 0 | 0 | 2 | 2 | 2 | 2 |
| | | | | | 0 | 0 | 0 | 1 | 2 | 2 | 2 | 2 |
| | | | | | 0 | 0 | 1 | 0 | 2 | 2 | 2 | 2 |
| | | | | | 0 | 0 | 1 | 1 | 2 | 2 | 2 | 2 |
| | | | | | 0 | 1 | 0 | 0 | 2 | 2 | 2 | 2 |
| | | | | | 0 | 1 | 0 | 1 | 2 | 2 | 2 | 2 |
| | | | | | 0 | 1 | 1 | 0 | 2 | 2 | 2 | 2 |
| | | | | | 0 | 1 | 1 | 1 | 2 | 2 | 2 | 2 |
| | | | | | 1 | 0 | 0 | 0 | 2 | 2 | 2 | 2 |
| | | | | | 1 | 0 | 0 | 1 | 2 | 2 | 2 | 2 |
| | | | | | 1 | 0 | 1 | 0 | 2 | 2 | 2 | 2 |
| | | | | | 1 | 0 | 1 | 1 | 2 | 2 | 2 | 2 |
| | | | | | 1 | 1 | 0 | 0 | 2 | 2 | 2 | 2 |
| | | | | | 1 | 1 | 0 | 1 | 2 | 2 | 2 | 2 |
| | | | | | 1 | 1 | 1 | 0 | 2 | 2 | 2 | 2 |
| | | | | | 1 | 1 | 1 | 1 | 2 | 2 | 2 | 2 |
| 5 | 0 | 1 | 0 | 1 | 0 | 0 | 0 | 0 | 0 | 0 | 2 | 0 |
| | | | | | 0 | 0 | 0 | 1 | 2 | 2 | 0 | 0 |
| | | | | | 0 | 0 | 1 | 0 | 2 | 2 | 0 | 0 |

|   |   |   |   |   | 0 | 0 | 1 | 1 | 0 | 0 | 2 | 0 |
|---|---|---|---|---|---|---|---|---|---|---|---|---|
|   |   |   |   |   | 0 | 1 | 0 | 0 | 0 | 0 | 2 | 0 |
|   |   |   |   |   | 0 | 1 | 0 | 1 | 2 | 2 | 0 | 0 |
|   |   |   |   |   | 0 | 1 | 1 | 0 | 2 | 2 | 0 | 0 |
|   |   |   |   |   | 0 | 1 | 1 | 1 | 0 | 0 | 2 | 0 |
|   |   |   |   |   | 1 | 0 | 0 | 0 | 0 | 2 | 2 | 0 |
|   |   |   |   |   | 1 | 0 | 0 | 1 | 2 | 0 | 0 | 0 |
|   |   |   |   |   | 1 | 0 | 1 | 0 | 2 | 0 | 0 | 0 |
|   |   |   |   |   | 1 | 0 | 1 | 1 | 0 | 2 | 2 | 0 |
|   |   |   |   |   | 1 | 1 | 0 | 0 | 0 | 2 | 2 | 0 |
|   |   |   |   |   | 1 | 1 | 0 | 1 | 2 | 0 | 0 | 0 |
|   |   |   |   |   | 1 | 1 | 1 | 0 | 2 | 0 | 0 | 0 |
|   |   |   |   |   | 1 | 1 | 1 | 1 | 0 | 2 | 2 | 0 |
| 6 | 0 | 1 | 1 | 0 | 0 | 0 | 0 | 0 | 1 | 1 | 2 | 1 |
|   |   |   |   |   | 0 | 0 | 0 | 1 | 2 | 2 | 1 | 1 |
|   |   |   |   |   | 0 | 0 | 1 | 0 | 2 | 2 | 1 | 1 |
|   |   |   |   |   | 0 | 0 | 1 | 1 | 1 | 1 | 2 | 1 |
|   |   |   |   |   | 0 | 1 | 0 | 0 | 1 | 1 | 2 | 1 |
|   |   |   |   |   | 0 | 1 | 0 | 1 | 2 | 2 | 1 | 1 |
|   |   |   |   |   | 0 | 1 | 1 | 0 | 2 | 2 | 1 | 1 |
|   |   |   |   |   | 0 | 1 | 1 | 1 | 1 | 1 | 2 | 1 |
|   |   |   |   |   | 1 | 0 | 0 | 0 | 1 | 2 | 2 | 1 |
|   |   |   |   |   | 1 | 0 | 0 | 1 | 2 | 1 | 1 | 1 |
|   |   |   |   |   | 1 | 0 | 1 | 0 | 2 | 1 | 1 | 1 |
|   |   |   |   |   | 1 | 0 | 1 | 1 | 1 | 2 | 2 | 1 |
|   |   |   |   |   | 1 | 1 | 0 | 0 | 1 | 2 | 2 | 1 |
|   |   |   |   |   | 1 | 1 | 0 | 1 | 2 | 1 | 1 | 1 |
|   |   |   |   |   | 1 | 1 | 1 | 0 | 2 | 1 | 1 | 1 |
|   |   |   |   |   | 1 | 1 | 1 | 1 | 1 | 2 | 2 | 1 |
| 7 | 0 | 1 | 1 | 1 | 0 | 0 | 0 | 0 | 0 | 2 | 1 | 0 |
|   |   |   |   |   | 0 | 0 | 0 | 1 | 1 | 2 | 0 | 0 |
|   |   |   |   |   | 0 | 0 | 1 | 0 | 1 | 2 | 0 | 0 |
|   |   |   |   |   | 0 | 0 | 1 | 1 | 2 | 2 | 1 | 0 |
|   |   |   |   |   | 0 | 1 | 0 | 0 | 1 | 0 | 2 | 0 |
|   |   |   |   |   | 0 | 1 | 0 | 1 | 2 | 1 | 0 | 0 |
|   |   |   |   |   | 0 | 1 | 1 | 0 | 2 | 1 | 0 | 0 |
|   |   |   |   |   | 0 | 1 | 1 | 1 | 0 | 2 | 1 | 0 |
|   |   |   |   |   | 1 | 0 | 0 | 0 | 0 | 2 | 1 | 0 |
|   |   |   |   |   | 1 | 0 | 0 | 1 | 1 | 2 | 0 | 0 |
|   |   |   |   |   | 1 | 0 | 1 | 0 | 1 | 2 | 0 | 0 |
|   |   |   |   |   | 1 | 0 | 1 | 1 | 2 | 2 | 1 | 0 |
|   |   |   |   |   | 1 | 1 | 0 | 0 | 1 | 0 | 2 | 0 |
|   |   |   |   |   | 1 | 1 | 0 | 1 | 2 | 1 | 0 | 0 |
|   |   |   |   |   | 1 | 1 | 1 | 0 | 2 | 1 | 0 | 0 |
|   |   |   |   |   | 1 | 1 | 1 | 1 | 0 | 2 | 1 | 0 |

| | | | | | | | | | | | | |
|---|---|---|---|---|---|---|---|---|---|---|---|---|
| 8 | 1 | 0 | 0 | 0 | 0 | 0 | 0 | 0 | 3 | 3 | 3 | 3 |
| | | | | | 0 | 0 | 0 | 1 | 3 | 3 | 3 | 3 |
| | | | | | 0 | 0 | 1 | 0 | 3 | 3 | 3 | 3 |
| | | | | | 0 | 0 | 1 | 1 | 3 | 3 | 3 | 3 |
| | | | | | 0 | 1 | 0 | 0 | 3 | 3 | 3 | 3 |
| | | | | | 0 | 1 | 0 | 1 | 3 | 3 | 3 | 3 |
| | | | | | 0 | 1 | 1 | 0 | 3 | 3 | 3 | 3 |
| | | | | | 0 | 1 | 1 | 1 | 3 | 3 | 3 | 3 |
| | | | | | 1 | 0 | 0 | 0 | 3 | 3 | 3 | 3 |
| | | | | | 1 | 0 | 0 | 1 | 3 | 3 | 3 | 3 |
| | | | | | 1 | 0 | 1 | 0 | 3 | 3 | 3 | 3 |
| | | | | | 1 | 0 | 1 | 1 | 3 | 3 | 3 | 3 |
| | | | | | 1 | 1 | 0 | 0 | 3 | 3 | 3 | 3 |
| | | | | | 1 | 1 | 0 | 1 | 3 | 3 | 3 | 3 |
| | | | | | 1 | 1 | 1 | 0 | 3 | 3 | 3 | 3 |
| | | | | | 1 | 1 | 1 | 1 | 3 | 3 | 3 | 3 |
| 9 | 1 | 0 | 0 | 1 | 0 | 0 | 0 | 0 | 0 | 0 | 3 | 0 |
| | | | | | 0 | 0 | 0 | 1 | 3 | 3 | 0 | 0 |
| | | | | | 0 | 0 | 1 | 0 | 3 | 3 | 0 | 0 |
| | | | | | 0 | 0 | 1 | 1 | 0 | 0 | 3 | 0 |
| | | | | | 0 | 1 | 0 | 0 | 0 | 0 | 3 | 0 |
| | | | | | 0 | 1 | 0 | 1 | 3 | 3 | 0 | 0 |
| | | | | | 0 | 1 | 1 | 0 | 3 | 3 | 0 | 0 |
| | | | | | 0 | 1 | 1 | 1 | 0 | 0 | 3 | 0 |
| | | | | | 1 | 0 | 0 | 0 | 0 | 3 | 3 | 0 |
| | | | | | 1 | 0 | 0 | 1 | 3 | 0 | 0 | 0 |
| | | | | | 1 | 0 | 1 | 0 | 3 | 0 | 0 | 0 |
| | | | | | 1 | 0 | 1 | 1 | 0 | 3 | 3 | 0 |
| | | | | | 1 | 1 | 0 | 0 | 0 | 3 | 3 | 0 |
| | | | | | 1 | 1 | 0 | 1 | 3 | 0 | 0 | 0 |
| | | | | | 1 | 1 | 1 | 0 | 3 | 0 | 0 | 0 |
| | | | | | 1 | 1 | 1 | 1 | 0 | 3 | 3 | 0 |
| 10 | 1 | 0 | 1 | 0 | 0 | 0 | 0 | 0 | 1 | 1 | 3 | 1 |
| | | | | | 0 | 0 | 0 | 1 | 3 | 3 | 1 | 1 |
| | | | | | 0 | 0 | 1 | 0 | 3 | 3 | 1 | 1 |
| | | | | | 0 | 0 | 1 | 1 | 1 | 1 | 3 | 1 |
| | | | | | 0 | 1 | 0 | 0 | 1 | 1 | 3 | 1 |
| | | | | | 0 | 1 | 0 | 1 | 3 | 3 | 1 | 1 |
| | | | | | 0 | 1 | 1 | 0 | 3 | 3 | 1 | 1 |
| | | | | | 0 | 1 | 1 | 1 | 1 | 1 | 3 | 1 |
| | | | | | 1 | 0 | 0 | 0 | 1 | 3 | 3 | 1 |
| | | | | | 1 | 0 | 0 | 1 | 3 | 1 | 1 | 1 |
| | | | | | 1 | 0 | 1 | 0 | 3 | 1 | 1 | 1 |
| | | | | | 1 | 0 | 1 | 1 | 1 | 3 | 3 | 1 |

|    |   |   |   |   | 1 | 1 | 0 | 0 | 1 | 3 | 3 | 1 |
|----|---|---|---|---|---|---|---|---|---|---|---|---|
|    |   |   |   |   | 1 | 1 | 0 | 1 | 3 | 1 | 1 | 1 |
|    |   |   |   |   | 1 | 1 | 1 | 0 | 3 | 1 | 1 | 1 |
|    |   |   |   |   | 1 | 1 | 1 | 1 | 1 | 3 | 3 | 1 |
| 11 | 1 | 0 | 1 | 1 | 0 | 0 | 0 | 0 | 0 | 3 | 1 | 0 |
|    |   |   |   |   | 0 | 0 | 0 | 1 | 1 | 3 | 0 | 0 |
|    |   |   |   |   | 0 | 0 | 1 | 0 | 1 | 3 | 0 | 0 |
|    |   |   |   |   | 0 | 0 | 1 | 1 | 3 | 3 | 1 | 0 |
|    |   |   |   |   | 0 | 1 | 0 | 0 | 1 | 0 | 3 | 0 |
|    |   |   |   |   | 0 | 1 | 0 | 1 | 3 | 1 | 0 | 0 |
|    |   |   |   |   | 0 | 1 | 1 | 0 | 3 | 1 | 0 | 0 |
|    |   |   |   |   | 0 | 1 | 1 | 1 | 0 | 3 | 1 | 0 |
|    |   |   |   |   | 1 | 0 | 0 | 0 | 0 | 3 | 1 | 0 |
|    |   |   |   |   | 1 | 0 | 0 | 1 | 1 | 3 | 0 | 0 |
|    |   |   |   |   | 1 | 0 | 1 | 0 | 1 | 3 | 0 | 0 |
|    |   |   |   |   | 1 | 0 | 1 | 1 | 3 | 3 | 1 | 0 |
|    |   |   |   |   | 1 | 1 | 0 | 0 | 1 | 0 | 3 | 0 |
|    |   |   |   |   | 1 | 1 | 0 | 1 | 3 | 1 | 0 | 0 |
|    |   |   |   |   | 1 | 1 | 1 | 0 | 3 | 1 | 0 | 0 |
|    |   |   |   |   | 1 | 1 | 1 | 1 | 0 | 3 | 1 | 0 |
| 12 | 1 | 1 | 0 | 0 | 0 | 0 | 0 | 0 | 2 | 2 | 3 | 2 |
|    |   |   |   |   | 0 | 0 | 0 | 1 | 3 | 3 | 2 | 2 |
|    |   |   |   |   | 0 | 0 | 1 | 0 | 3 | 3 | 2 | 2 |
|    |   |   |   |   | 0 | 0 | 1 | 1 | 2 | 2 | 3 | 2 |
|    |   |   |   |   | 0 | 1 | 0 | 0 | 2 | 2 | 3 | 2 |
|    |   |   |   |   | 0 | 1 | 0 | 1 | 3 | 3 | 2 | 2 |
|    |   |   |   |   | 0 | 1 | 1 | 0 | 3 | 3 | 2 | 2 |
|    |   |   |   |   | 0 | 1 | 1 | 1 | 2 | 2 | 3 | 2 |
|    |   |   |   |   | 1 | 0 | 0 | 0 | 2 | 3 | 3 | 2 |
|    |   |   |   |   | 1 | 0 | 0 | 1 | 3 | 2 | 2 | 2 |
|    |   |   |   |   | 1 | 0 | 1 | 0 | 3 | 2 | 2 | 2 |
|    |   |   |   |   | 1 | 0 | 1 | 1 | 2 | 3 | 3 | 2 |
|    |   |   |   |   | 1 | 1 | 0 | 0 | 2 | 3 | 3 | 2 |
|    |   |   |   |   | 1 | 1 | 0 | 1 | 3 | 2 | 2 | 2 |
|    |   |   |   |   | 1 | 1 | 1 | 0 | 3 | 2 | 2 | 2 |
|    |   |   |   |   | 1 | 1 | 1 | 1 | 2 | 3 | 3 | 2 |
| 13 | 1 | 1 | 0 | 1 | 0 | 0 | 0 | 0 | 0 | 3 | 2 | 0 |
|    |   |   |   |   | 0 | 0 | 0 | 1 | 2 | 3 | 0 | 0 |
|    |   |   |   |   | 0 | 0 | 1 | 0 | 2 | 3 | 0 | 0 |
|    |   |   |   |   | 0 | 0 | 1 | 1 | 3 | 3 | 2 | 0 |
|    |   |   |   |   | 0 | 1 | 0 | 0 | 2 | 0 | 3 | 0 |
|    |   |   |   |   | 0 | 1 | 0 | 1 | 3 | 2 | 0 | 0 |
|    |   |   |   |   | 0 | 1 | 1 | 0 | 3 | 2 | 0 | 0 |
|    |   |   |   |   | 0 | 1 | 1 | 1 | 0 | 3 | 2 | 0 |

| | | | | | | | | | | | | |
|---|---|---|---|---|---|---|---|---|---|---|---|---|
| | | | | | 1 | 0 | 0 | 0 | 0 | 3 | 2 | 0 |
| | | | | | 1 | 0 | 0 | 1 | 2 | 3 | 0 | 0 |
| | | | | | 1 | 0 | 1 | 0 | 2 | 3 | 0 | 0 |
| | | | | | 1 | 0 | 1 | 1 | 3 | 3 | 2 | 0 |
| | | | | | 1 | 1 | 0 | 0 | 2 | 0 | 3 | 0 |
| | | | | | 1 | 1 | 0 | 1 | 3 | 2 | 0 | 0 |
| | | | | | 1 | 1 | 1 | 0 | 3 | 2 | 0 | 0 |
| | | | | | 1 | 1 | 1 | 1 | 0 | 3 | 2 | 0 |
| 14 | 1 | 1 | 1 | 0 | 0 | 0 | 0 | 0 | 1 | 3 | 2 | 1 |
| | | | | | 0 | 0 | 0 | 1 | 2 | 3 | 1 | 1 |
| | | | | | 0 | 0 | 1 | 0 | 2 | 3 | 1 | 1 |
| | | | | | 0 | 0 | 1 | 1 | 3 | 3 | 2 | 1 |
| | | | | | 0 | 1 | 0 | 0 | 2 | 1 | 3 | 1 |
| | | | | | 0 | 1 | 0 | 1 | 3 | 2 | 1 | 1 |
| | | | | | 0 | 1 | 1 | 0 | 3 | 2 | 1 | 1 |
| | | | | | 0 | 1 | 1 | 1 | 1 | 3 | 2 | 1 |
| | | | | | 1 | 0 | 0 | 0 | 1 | 3 | 2 | 1 |
| | | | | | 1 | 0 | 0 | 1 | 2 | 3 | 1 | 1 |
| | | | | | 1 | 0 | 1 | 0 | 2 | 3 | 1 | 1 |
| | | | | | 1 | 0 | 1 | 1 | 3 | 3 | 2 | 1 |
| | | | | | 1 | 1 | 0 | 0 | 2 | 1 | 3 | 1 |
| | | | | | 1 | 1 | 0 | 1 | 3 | 2 | 1 | 1 |
| | | | | | 1 | 1 | 1 | 0 | 3 | 2 | 1 | 1 |
| | | | | | 1 | 1 | 1 | 1 | 1 | 3 | 2 | 1 |
| 15 | 1 | 1 | 1 | 1 | 0 | 0 | 0 | 0 | 3 | 2 | 1 | 0 |
| | | | | | 0 | 0 | 0 | 1 | 3 | 2 | 1 | 0 |
| | | | | | 0 | 0 | 1 | 0 | 3 | 2 | 0 | 1 |
| | | | | | 0 | 0 | 1 | 1 | 3 | 2 | 1 | 0 |
| | | | | | 0 | 1 | 0 | 0 | 3 | 0 | 2 | 1 |
| | | | | | 0 | 1 | 0 | 1 | 3 | 1 | 2 | 0 |
| | | | | | 0 | 1 | 1 | 0 | 3 | 1 | 0 | 2 |
| | | | | | 0 | 1 | 1 | 1 | 3 | 2 | 1 | 0 |
| | | | | | 1 | 0 | 0 | 0 | 0 | 3 | 1 | 1 |
| | | | | | 1 | 0 | 0 | 1 | 1 | 3 | 2 | 0 |
| | | | | | 1 | 0 | 1 | 0 | 1 | 3 | 0 | 2 |
| | | | | | 1 | 0 | 1 | 1 | 2 | 3 | 1 | 0 |
| | | | | | 1 | 1 | 0 | 0 | 1 | 0 | 3 | 2 |
| | | | | | 1 | 1 | 0 | 1 | 2 | 1 | 3 | 0 |
| | | | | | 1 | 1 | 1 | 0 | 2 | 1 | 0 | 3 |
| | | | | | 1 | 1 | 1 | 1 | 3 | 2 | 1 | 0 |

Appendix B

| Group | Active Fragments | | | | Active Channels | | | | Fragment Mapping | | | |
|---|---|---|---|---|---|---|---|---|---|---|---|---|
| | 3 | 2 | 1 | 0 | 3 | 2 | 1 | 0 | Ch 3 | Ch 2 | Ch 1 | Ch 0 |
| 0 | 0 | 0 | 0 | 0 | 0 | 0 | 0 | 0 | 0 | 0 | 0 | 0 |
| | | | | | 0 | 0 | 0 | 1 | 0 | 0 | 0 | 0 |
| | | | | | 0 | 0 | 1 | 0 | 0 | 0 | 0 | 0 |
| | | | | | 0 | 0 | 1 | 1 | 0 | 0 | 0 | 0 |
| | | | | | 0 | 1 | 0 | 0 | 0 | 0 | 0 | 0 |
| | | | | | 0 | 1 | 0 | 1 | 0 | 0 | 0 | 0 |
| | | | | | 0 | 1 | 1 | 0 | 0 | 0 | 0 | 0 |
| | | | | | 0 | 1 | 1 | 1 | 0 | 0 | 0 | 0 |
| | | | | | 1 | 0 | 0 | 0 | 0 | 0 | 0 | 0 |
| | | | | | 1 | 0 | 0 | 1 | 0 | 0 | 0 | 0 |
| | | | | | 1 | 0 | 1 | 0 | 0 | 0 | 0 | 0 |
| | | | | | 1 | 0 | 1 | 1 | 0 | 0 | 0 | 0 |
| | | | | | 1 | 1 | 0 | 0 | 0 | 0 | 0 | 0 |
| | | | | | 1 | 1 | 0 | 1 | 0 | 0 | 0 | 0 |
| | | | | | 1 | 1 | 1 | 0 | 0 | 0 | 0 | 0 |
| | | | | | 1 | 1 | 1 | 1 | 0 | 0 | 0 | 0 |
| 1 | 0 | 0 | 0 | 1 | 0 | 0 | 0 | 0 | 0 | 0 | 0 | 0 |
| | | | | | 0 | 0 | 0 | 1 | 0 | 0 | 0 | 0 |
| | | | | | 0 | 0 | 1 | 0 | 0 | 0 | 0 | 0 |
| | | | | | 0 | 0 | 1 | 1 | 0 | 0 | 0 | 0 |
| | | | | | 0 | 1 | 0 | 0 | 0 | 0 | 0 | 0 |
| | | | | | 0 | 1 | 0 | 1 | 0 | 0 | 0 | 0 |
| | | | | | 0 | 1 | 1 | 0 | 0 | 0 | 0 | 0 |
| | | | | | 0 | 1 | 1 | 1 | 0 | 0 | 0 | 0 |
| | | | | | 1 | 0 | 0 | 0 | 0 | 0 | 0 | 0 |
| | | | | | 1 | 0 | 0 | 1 | 0 | 0 | 0 | 0 |
| | | | | | 1 | 0 | 1 | 0 | 0 | 0 | 0 | 0 |
| | | | | | 1 | 0 | 1 | 1 | 0 | 0 | 0 | 0 |
| | | | | | 1 | 1 | 0 | 0 | 0 | 0 | 0 | 0 |
| | | | | | 1 | 1 | 0 | 1 | 0 | 0 | 0 | 0 |
| | | | | | 1 | 1 | 1 | 0 | 0 | 0 | 0 | 0 |
| | | | | | 1 | 1 | 1 | 1 | 0 | 0 | 0 | 0 |
| 2 | 0 | 0 | 1 | 0 | 0 | 0 | 0 | 0 | 1 | 1 | 1 | 1 |
| | | | | | 0 | 0 | 0 | 1 | 1 | 1 | 1 | 1 |
| | | | | | 0 | 0 | 1 | 0 | 1 | 1 | 1 | 1 |
| | | | | | 0 | 0 | 1 | 1 | 1 | 1 | 1 | 1 |
| | | | | | 0 | 1 | 0 | 0 | 1 | 1 | 1 | 1 |
| | | | | | 0 | 1 | 0 | 1 | 1 | 1 | 1 | 1 |
| | | | | | 0 | 1 | 1 | 0 | 1 | 1 | 1 | 1 |

|   |   |   |   |   | 0 | 1 | 1 | 1 | 1 | 1 | 1 | 1 |
|---|---|---|---|---|---|---|---|---|---|---|---|---|
|   |   |   |   |   | 1 | 0 | 0 | 0 | 1 | 1 | 1 | 1 |
|   |   |   |   |   | 1 | 0 | 0 | 1 | 1 | 1 | 1 | 1 |
|   |   |   |   |   | 1 | 0 | 1 | 0 | 1 | 1 | 1 | 1 |
|   |   |   |   |   | 1 | 0 | 1 | 1 | 1 | 1 | 1 | 1 |
|   |   |   |   |   | 1 | 1 | 0 | 0 | 1 | 1 | 1 | 1 |
|   |   |   |   |   | 1 | 1 | 0 | 1 | 1 | 1 | 1 | 1 |
|   |   |   |   |   | 1 | 1 | 1 | 0 | 1 | 1 | 1 | 1 |
|   |   |   |   |   | 1 | 1 | 1 | 1 | 1 | 1 | 1 | 1 |
| 3 | 0 | 0 | 1 | 1 | 0 | 0 | 0 | 0 | 0 | 0 | 1 | 0 |
|   |   |   |   |   | 0 | 0 | 0 | 1 | 1 | 1 | 0 | 0 |
|   |   |   |   |   | 0 | 0 | 1 | 0 | 1 | 1 | 0 | 0 |
|   |   |   |   |   | 0 | 0 | 1 | 1 | 0 | 0 | 1 | 0 |
|   |   |   |   |   | 0 | 1 | 0 | 0 | 0 | 0 | 1 | 0 |
|   |   |   |   |   | 0 | 1 | 0 | 1 | 1 | 1 | 0 | 0 |
|   |   |   |   |   | 0 | 1 | 1 | 0 | 1 | 1 | 0 | 0 |
|   |   |   |   |   | 0 | 1 | 1 | 1 | 0 | 0 | 1 | 0 |
|   |   |   |   |   | 1 | 0 | 0 | 0 | 0 | 1 | 1 | 0 |
|   |   |   |   |   | 1 | 0 | 0 | 1 | 1 | 0 | 0 | 0 |
|   |   |   |   |   | 1 | 0 | 1 | 0 | 1 | 0 | 0 | 0 |
|   |   |   |   |   | 1 | 0 | 1 | 1 | 0 | 1 | 1 | 0 |
|   |   |   |   |   | 1 | 1 | 0 | 0 | 0 | 1 | 1 | 0 |
|   |   |   |   |   | 1 | 1 | 0 | 1 | 1 | 0 | 0 | 0 |
|   |   |   |   |   | 1 | 1 | 1 | 0 | 1 | 0 | 0 | 0 |
|   |   |   |   |   | 1 | 1 | 1 | 1 | 0 | 1 | 1 | 0 |
| 4 | 0 | 1 | 0 | 0 | 0 | 0 | 0 | 0 | 2 | 2 | 2 | 2 |
|   |   |   |   |   | 0 | 0 | 0 | 1 | 2 | 2 | 2 | 2 |
|   |   |   |   |   | 0 | 0 | 1 | 0 | 2 | 2 | 2 | 2 |
|   |   |   |   |   | 0 | 0 | 1 | 1 | 2 | 2 | 2 | 2 |
|   |   |   |   |   | 0 | 1 | 0 | 0 | 2 | 2 | 2 | 2 |
|   |   |   |   |   | 0 | 1 | 0 | 1 | 2 | 2 | 2 | 2 |
|   |   |   |   |   | 0 | 1 | 1 | 0 | 2 | 2 | 2 | 2 |
|   |   |   |   |   | 0 | 1 | 1 | 1 | 2 | 2 | 2 | 2 |
|   |   |   |   |   | 1 | 0 | 0 | 0 | 2 | 2 | 2 | 2 |
|   |   |   |   |   | 1 | 0 | 0 | 1 | 2 | 2 | 2 | 2 |
|   |   |   |   |   | 1 | 0 | 1 | 0 | 2 | 2 | 2 | 2 |
|   |   |   |   |   | 1 | 0 | 1 | 1 | 2 | 2 | 2 | 2 |
|   |   |   |   |   | 1 | 1 | 0 | 0 | 2 | 2 | 2 | 2 |
|   |   |   |   |   | 1 | 1 | 0 | 1 | 2 | 2 | 2 | 2 |
|   |   |   |   |   | 1 | 1 | 1 | 0 | 2 | 2 | 2 | 2 |
|   |   |   |   |   | 1 | 1 | 1 | 1 | 2 | 2 | 2 | 2 |
| 5 | 0 | 1 | 0 | 1 | 0 | 0 | 0 | 0 | 0 | 0 | 2 | 0 |
|   |   |   |   |   | 0 | 0 | 0 | 1 | 2 | 2 | 0 | 0 |
|   |   |   |   |   | 0 | 0 | 1 | 0 | 2 | 2 | 0 | 0 |

|   |   |   |   |   | 0 | 0 | 1 | 1 | 0 | 0 | 2 | 0 |
|---|---|---|---|---|---|---|---|---|---|---|---|---|
|   |   |   |   |   | 0 | 1 | 0 | 0 | 0 | 0 | 2 | 0 |
|   |   |   |   |   | 0 | 1 | 0 | 1 | 2 | 2 | 0 | 0 |
|   |   |   |   |   | 0 | 1 | 1 | 0 | 2 | 2 | 0 | 0 |
|   |   |   |   |   | 0 | 1 | 1 | 1 | 0 | 0 | 2 | 0 |
|   |   |   |   |   | 1 | 0 | 0 | 0 | 0 | 2 | 2 | 0 |
|   |   |   |   |   | 1 | 0 | 0 | 1 | 2 | 0 | 0 | 0 |
|   |   |   |   |   | 1 | 0 | 1 | 0 | 2 | 0 | 0 | 0 |
|   |   |   |   |   | 1 | 0 | 1 | 1 | 0 | 2 | 2 | 0 |
|   |   |   |   |   | 1 | 1 | 0 | 0 | 0 | 2 | 2 | 0 |
|   |   |   |   |   | 1 | 1 | 0 | 1 | 2 | 0 | 0 | 0 |
|   |   |   |   |   | 1 | 1 | 1 | 0 | 2 | 0 | 0 | 0 |
|   |   |   |   |   | 1 | 1 | 1 | 1 | 0 | 2 | 2 | 0 |
| 6 | 0 | 1 | 1 | 0 | 0 | 0 | 0 | 0 | 1 | 1 | 2 | 1 |
|   |   |   |   |   | 0 | 0 | 0 | 1 | 2 | 2 | 1 | 1 |
|   |   |   |   |   | 0 | 0 | 1 | 0 | 2 | 2 | 1 | 1 |
|   |   |   |   |   | 0 | 0 | 1 | 1 | 1 | 1 | 2 | 1 |
|   |   |   |   |   | 0 | 1 | 0 | 0 | 1 | 1 | 2 | 1 |
|   |   |   |   |   | 0 | 1 | 0 | 1 | 2 | 2 | 1 | 1 |
|   |   |   |   |   | 0 | 1 | 1 | 0 | 2 | 2 | 1 | 1 |
|   |   |   |   |   | 0 | 1 | 1 | 1 | 1 | 1 | 2 | 1 |
|   |   |   |   |   | 1 | 0 | 0 | 0 | 1 | 2 | 2 | 1 |
|   |   |   |   |   | 1 | 0 | 0 | 1 | 2 | 1 | 1 | 1 |
|   |   |   |   |   | 1 | 0 | 1 | 0 | 2 | 1 | 1 | 1 |
|   |   |   |   |   | 1 | 0 | 1 | 1 | 1 | 2 | 2 | 1 |
|   |   |   |   |   | 1 | 1 | 0 | 0 | 1 | 2 | 2 | 1 |
|   |   |   |   |   | 1 | 1 | 0 | 1 | 2 | 1 | 1 | 1 |
|   |   |   |   |   | 1 | 1 | 1 | 0 | 2 | 1 | 1 | 1 |
|   |   |   |   |   | 1 | 1 | 1 | 1 | 1 | 2 | 2 | 1 |
| 7 | 0 | 1 | 1 | 1 | 0 | 0 | 0 | 0 | 0 | 2 | 1 | 0 |
|   |   |   |   |   | 0 | 0 | 0 | 1 | 1 | 2 | 0 | 0 |
|   |   |   |   |   | 0 | 0 | 1 | 0 | 1 | 2 | 0 | 0 |
|   |   |   |   |   | 0 | 0 | 1 | 1 | 2 | 2 | 1 | 0 |
|   |   |   |   |   | 0 | 1 | 0 | 0 | 1 | 0 | 2 | 0 |
|   |   |   |   |   | 0 | 1 | 0 | 1 | 2 | 1 | 0 | 0 |
|   |   |   |   |   | 0 | 1 | 1 | 0 | 2 | 1 | 0 | 0 |
|   |   |   |   |   | 0 | 1 | 1 | 1 | 0 | 2 | 1 | 0 |
|   |   |   |   |   | 1 | 0 | 0 | 0 | 0 | 2 | 1 | 0 |
|   |   |   |   |   | 1 | 0 | 0 | 1 | 1 | 2 | 0 | 0 |
|   |   |   |   |   | 1 | 0 | 1 | 0 | 1 | 2 | 0 | 0 |
|   |   |   |   |   | 1 | 0 | 1 | 1 | 2 | 2 | 1 | 0 |
|   |   |   |   |   | 1 | 1 | 0 | 0 | 1 | 0 | 2 | 0 |
|   |   |   |   |   | 1 | 1 | 0 | 1 | 2 | 1 | 0 | 0 |
|   |   |   |   |   | 1 | 1 | 1 | 0 | 2 | 1 | 0 | 0 |
|   |   |   |   |   | 1 | 1 | 1 | 1 | 0 | 2 | 1 | 0 |

-20-

| | | | | | | | | | | | | |
|---|---|---|---|---|---|---|---|---|---|---|---|---|
| 8 | 1 | 0 | 0 | 0 | 0 | 0 | 0 | 0 | 3 | 3 | 3 | 3 |
| | | | | | 0 | 0 | 0 | 1 | 3 | 3 | 3 | 3 |
| | | | | | 0 | 0 | 1 | 0 | 3 | 3 | 3 | 3 |
| | | | | | 0 | 0 | 1 | 1 | 3 | 3 | 3 | 3 |
| | | | | | 0 | 1 | 0 | 0 | 3 | 3 | 3 | 3 |
| | | | | | 0 | 1 | 0 | 1 | 3 | 3 | 3 | 3 |
| | | | | | 0 | 1 | 1 | 0 | 3 | 3 | 3 | 3 |
| | | | | | 0 | 1 | 1 | 1 | 3 | 3 | 3 | 3 |
| | | | | | 1 | 0 | 0 | 0 | 3 | 3 | 3 | 3 |
| | | | | | 1 | 0 | 0 | 1 | 3 | 3 | 3 | 3 |
| | | | | | 1 | 0 | 1 | 0 | 3 | 3 | 3 | 3 |
| | | | | | 1 | 0 | 1 | 1 | 3 | 3 | 3 | 3 |
| | | | | | 1 | 1 | 0 | 0 | 3 | 3 | 3 | 3 |
| | | | | | 1 | 1 | 0 | 1 | 3 | 3 | 3 | 3 |
| | | | | | 1 | 1 | 1 | 0 | 3 | 3 | 3 | 3 |
| | | | | | 1 | 1 | 1 | 1 | 3 | 3 | 3 | 3 |
| 9 | 1 | 0 | 0 | 1 | 0 | 0 | 0 | 0 | 0 | 0 | 3 | 0 |
| | | | | | 0 | 0 | 0 | 1 | 3 | 3 | 0 | 0 |
| | | | | | 0 | 0 | 1 | 0 | 3 | 3 | 0 | 0 |
| | | | | | 0 | 0 | 1 | 1 | 0 | 0 | 3 | 0 |
| | | | | | 0 | 1 | 0 | 0 | 0 | 0 | 3 | 0 |
| | | | | | 0 | 1 | 0 | 1 | 3 | 3 | 0 | 0 |
| | | | | | 0 | 1 | 1 | 0 | 3 | 3 | 0 | 0 |
| | | | | | 0 | 1 | 1 | 1 | 0 | 0 | 3 | 0 |
| | | | | | 1 | 0 | 0 | 0 | 0 | 3 | 3 | 0 |
| | | | | | 1 | 0 | 0 | 1 | 3 | 0 | 0 | 0 |
| | | | | | 1 | 0 | 1 | 0 | 3 | 0 | 0 | 0 |
| | | | | | 1 | 0 | 1 | 1 | 0 | 3 | 3 | 0 |
| | | | | | 1 | 1 | 0 | 0 | 0 | 3 | 3 | 0 |
| | | | | | 1 | 1 | 0 | 1 | 3 | 0 | 0 | 0 |
| | | | | | 1 | 1 | 1 | 0 | 3 | 0 | 0 | 0 |
| | | | | | 1 | 1 | 1 | 1 | 0 | 3 | 3 | 0 |
| 10 | 1 | 0 | 1 | 0 | 0 | 0 | 0 | 0 | 1 | 1 | 3 | 1 |
| | | | | | 0 | 0 | 0 | 1 | 3 | 3 | 1 | 1 |
| | | | | | 0 | 0 | 1 | 0 | 3 | 3 | 1 | 1 |
| | | | | | 0 | 0 | 1 | 1 | 1 | 1 | 3 | 1 |
| | | | | | 0 | 1 | 0 | 0 | 1 | 1 | 3 | 1 |
| | | | | | 0 | 1 | 0 | 1 | 3 | 3 | 1 | 1 |
| | | | | | 0 | 1 | 1 | 0 | 3 | 3 | 1 | 1 |
| | | | | | 0 | 1 | 1 | 1 | 1 | 1 | 3 | 1 |
| | | | | | 1 | 0 | 0 | 0 | 1 | 3 | 3 | 1 |
| | | | | | 1 | 0 | 0 | 1 | 3 | 1 | 1 | 1 |
| | | | | | 1 | 0 | 1 | 0 | 3 | 1 | 1 | 1 |
| | | | | | 1 | 0 | 1 | 1 | 1 | 3 | 3 | 1 |

|    |   |   |   |   |   |   |   |   |   |   |   |   |
|----|---|---|---|---|---|---|---|---|---|---|---|---|
|    |   |   |   |   | 1 | 1 | 0 | 0 | 1 | 3 | 3 | 1 |
|    |   |   |   |   | 1 | 1 | 0 | 1 | 3 | 1 | 1 | 1 |
|    |   |   |   |   | 1 | 1 | 1 | 0 | 3 | 1 | 1 | 1 |
|    |   |   |   |   | 1 | 1 | 1 | 1 | 1 | 3 | 3 | 1 |
| 11 | 1 | 0 | 1 | 1 | 0 | 0 | 0 | 0 | 0 | 3 | 1 | 0 |
|    |   |   |   |   | 0 | 0 | 0 | 1 | 1 | 3 | 0 | 0 |
|    |   |   |   |   | 0 | 0 | 1 | 0 | 1 | 3 | 0 | 0 |
|    |   |   |   |   | 0 | 0 | 1 | 1 | 3 | 3 | 1 | 0 |
|    |   |   |   |   | 0 | 1 | 0 | 0 | 1 | 0 | 3 | 0 |
|    |   |   |   |   | 0 | 1 | 0 | 1 | 3 | 1 | 0 | 0 |
|    |   |   |   |   | 0 | 1 | 1 | 0 | 3 | 1 | 0 | 0 |
|    |   |   |   |   | 0 | 1 | 1 | 1 | 0 | 3 | 1 | 0 |
|    |   |   |   |   | 1 | 0 | 0 | 0 | 0 | 3 | 1 | 0 |
|    |   |   |   |   | 1 | 0 | 0 | 1 | 1 | 3 | 0 | 0 |
|    |   |   |   |   | 1 | 0 | 1 | 0 | 1 | 3 | 0 | 0 |
|    |   |   |   |   | 1 | 0 | 1 | 1 | 3 | 3 | 1 | 0 |
|    |   |   |   |   | 1 | 1 | 0 | 0 | 1 | 0 | 3 | 0 |
|    |   |   |   |   | 1 | 1 | 0 | 1 | 3 | 1 | 0 | 0 |
|    |   |   |   |   | 1 | 1 | 1 | 0 | 3 | 1 | 0 | 0 |
|    |   |   |   |   | 1 | 1 | 1 | 1 | 0 | 3 | 1 | 0 |
| 12 | 1 | 1 | 0 | 0 | 0 | 0 | 0 | 0 | 2 | 2 | 3 | 2 |
|    |   |   |   |   | 0 | 0 | 0 | 1 | 3 | 3 | 2 | 2 |
|    |   |   |   |   | 0 | 0 | 1 | 0 | 3 | 3 | 2 | 2 |
|    |   |   |   |   | 0 | 0 | 1 | 1 | 2 | 2 | 3 | 2 |
|    |   |   |   |   | 0 | 1 | 0 | 0 | 2 | 2 | 3 | 2 |
|    |   |   |   |   | 0 | 1 | 0 | 1 | 3 | 3 | 2 | 2 |
|    |   |   |   |   | 0 | 1 | 1 | 0 | 3 | 3 | 2 | 2 |
|    |   |   |   |   | 0 | 1 | 1 | 1 | 2 | 2 | 3 | 2 |
|    |   |   |   |   | 1 | 0 | 0 | 0 | 2 | 3 | 3 | 2 |
|    |   |   |   |   | 1 | 0 | 0 | 1 | 3 | 2 | 2 | 2 |
|    |   |   |   |   | 1 | 0 | 1 | 0 | 3 | 2 | 2 | 2 |
|    |   |   |   |   | 1 | 0 | 1 | 1 | 2 | 3 | 3 | 2 |
|    |   |   |   |   | 1 | 1 | 0 | 0 | 2 | 3 | 3 | 2 |
|    |   |   |   |   | 1 | 1 | 0 | 1 | 3 | 2 | 2 | 2 |
|    |   |   |   |   | 1 | 1 | 1 | 0 | 3 | 2 | 2 | 2 |
|    |   |   |   |   | 1 | 1 | 1 | 1 | 2 | 3 | 3 | 2 |
| 13 | 1 | 1 | 0 | 1 | 0 | 0 | 0 | 0 | 0 | 3 | 2 | 0 |
|    |   |   |   |   | 0 | 0 | 0 | 1 | 2 | 3 | 0 | 0 |
|    |   |   |   |   | 0 | 0 | 1 | 0 | 2 | 3 | 0 | 0 |
|    |   |   |   |   | 0 | 0 | 1 | 1 | 3 | 3 | 2 | 0 |
|    |   |   |   |   | 0 | 1 | 0 | 0 | 2 | 0 | 3 | 0 |
|    |   |   |   |   | 0 | 1 | 0 | 1 | 3 | 2 | 0 | 0 |
|    |   |   |   |   | 0 | 1 | 1 | 0 | 3 | 2 | 0 | 0 |
|    |   |   |   |   | 0 | 1 | 1 | 1 | 0 | 3 | 2 | 0 |

|    |   |   |   |   | 1 | 0 | 0 | 0 | 0 | 3 | 2 | 0 |
|----|---|---|---|---|---|---|---|---|---|---|---|---|
|    |   |   |   |   | 1 | 0 | 0 | 1 | 2 | 3 | 0 | 0 |
|    |   |   |   |   | 1 | 0 | 1 | 0 | 2 | 3 | 0 | 0 |
|    |   |   |   |   | 1 | 0 | 1 | 1 | 3 | 3 | 2 | 0 |
|    |   |   |   |   | 1 | 1 | 0 | 0 | 2 | 0 | 3 | 0 |
|    |   |   |   |   | 1 | 1 | 0 | 1 | 3 | 2 | 0 | 0 |
|    |   |   |   |   | 1 | 1 | 1 | 0 | 3 | 2 | 0 | 0 |
|    |   |   |   |   | 1 | 1 | 1 | 1 | 0 | 3 | 2 | 0 |
| 14 | 1 | 1 | 1 | 0 | 0 | 0 | 0 | 0 | 1 | 3 | 2 | 1 |
|    |   |   |   |   | 0 | 0 | 0 | 1 | 2 | 3 | 1 | 1 |
|    |   |   |   |   | 0 | 0 | 1 | 0 | 2 | 3 | 1 | 1 |
|    |   |   |   |   | 0 | 0 | 1 | 1 | 3 | 3 | 2 | 1 |
|    |   |   |   |   | 0 | 1 | 0 | 0 | 2 | 1 | 3 | 1 |
|    |   |   |   |   | 0 | 1 | 0 | 1 | 3 | 2 | 1 | 1 |
|    |   |   |   |   | 0 | 1 | 1 | 0 | 3 | 2 | 1 | 1 |
|    |   |   |   |   | 0 | 1 | 1 | 1 | 1 | 3 | 2 | 1 |
|    |   |   |   |   | 1 | 0 | 0 | 0 | 1 | 3 | 2 | 1 |
|    |   |   |   |   | 1 | 0 | 0 | 1 | 2 | 3 | 1 | 1 |
|    |   |   |   |   | 1 | 0 | 1 | 0 | 2 | 3 | 1 | 1 |
|    |   |   |   |   | 1 | 0 | 1 | 1 | 3 | 3 | 2 | 1 |
|    |   |   |   |   | 1 | 1 | 0 | 0 | 2 | 1 | 3 | 1 |
|    |   |   |   |   | 1 | 1 | 0 | 1 | 3 | 2 | 1 | 1 |
|    |   |   |   |   | 1 | 1 | 1 | 0 | 3 | 2 | 1 | 1 |
|    |   |   |   |   | 1 | 1 | 1 | 1 | 1 | 3 | 2 | 1 |
| 15 | 1 | 1 | 1 | 1 | 0 | 0 | 0 | 0 | 2 | 1 | 0 | 3 |
|    |   |   |   |   | 0 | 0 | 0 | 1 | 3 | 2 | 1 | 0 |
|    |   |   |   |   | 0 | 0 | 1 | 0 | 2 | 1 | 0 | 3 |
|    |   |   |   |   | 0 | 0 | 1 | 1 | 3 | 2 | 1 | 0 |
|    |   |   |   |   | 0 | 1 | 0 | 0 | 2 | 0 | 1 | 3 |
|    |   |   |   |   | 0 | 1 | 0 | 1 | 3 | 1 | 2 | 0 |
|    |   |   |   |   | 0 | 1 | 1 | 0 | 2 | 0 | 1 | 3 |
|    |   |   |   |   | 0 | 1 | 1 | 1 | 3 | 1 | 2 | 0 |
|    |   |   |   |   | 1 | 0 | 0 | 0 | 0 | 1 | 2 | 3 |
|    |   |   |   |   | 1 | 0 | 0 | 1 | 1 | 2 | 3 | 0 |
|    |   |   |   |   | 1 | 0 | 1 | 0 | 0 | 2 | 1 | 3 |
|    |   |   |   |   | 1 | 0 | 1 | 1 | 1 | 3 | 2 | 0 |
|    |   |   |   |   | 1 | 1 | 0 | 0 | 0 | 1 | 2 | 3 |
|    |   |   |   |   | 1 | 1 | 0 | 1 | 1 | 2 | 3 | 0 |
|    |   |   |   |   | 1 | 1 | 1 | 0 | 0 | 2 | 1 | 3 |
|    |   |   |   |   | 1 | 1 | 1 | 1 | 1 | 3 | 2 | 0 |

What is claimed is:

1. A communication system that provides dynamic arbitrary mapping of multiple transmit buffers to multiple channels in an efficient, low-cost, manner that provides low latency and a high probability of successful transmission even when some of the channels are corrupted by time-changing noise that temporarily and unpredictably renders some channels unusable, comprising:
a plurality of transmit buffers, each buffer corresponding to its own unique bit in an active-fragment register, each of said transmit buffers being an active buffer when said unique bit in said active-fragment register is asserted;
a plurality of channel transmitters, each channel transmitter corresponding to its own unique bit in an active-channel register, each of said channel transmitters corresponding to an active channel when said unique bit in said active-channel register is asserted; and
channel-mapping logic configured to map said transmit buffers to said channel transmitters according to data in said active-fragment register and said active-channel register, said channel mapping logic configured to map as many active fragments as possible into active channels, said channel mapping logic further configured to map active buffers to more than one channel once all active buffers have been mapped to at least one channel.

2. The communication system of claim 1, wherein the number of said transmit buffers is the same as the number of said channel transmitters.

3. The communication system of claim 1, wherein one or more of said active channels is carried by a power line networking system.

4. The communication system of claim 1, wherein one or more of said channels is carried by a radio-frequency transmission system.

5. The communication system of claim 1, wherein said channel-mapping logic comprises a plurality of M-input one-output multiplexers, where M is the number of transmit buffers and an output of each transmit buffer is provided to one and only one input of each of said multiplexers and the output of each multiplexer is provided to an input of one and only one channel transmitter.

6. The communication system of claim 1, further comprising a good-channel register, wherein data from said good channel register is used to update said active-channel register and said active-fragment register.

7. The communication system of claim 6, wherein said good-channel register is configured to be loaded with a bitmask from an acknowledge packet, said acknowledge packet sent from a receiving node to a transmitting node in response to transmission of data from said transmitting node to said receiving node, said bitmask indicating on which of said channels said receiver successfully received data and on which of said channels said receiver did not successfully receive data in response to a previous transmission from said transmitting node.

8. The communication system of claim 1, wherein at least one of said channels is carried by a communication medium.

9. The communication system of claim 8, wherein said communication medium comprises a coaxial cable.

10. The communication system of claim 8, wherein said communication medium comprises a twisted-pair cable.

11. The communication system of claim 8, wherein said communication medium comprises a fiber-optic cable.

12. The communication system of claim 1, wherein data is modulated onto said active channel using differential Binary Phase Shift Keying.

13. The communication system of claim 1, wherein data is modulated onto said active channel using differential Quadrature Phase Shift Keying.

14. The communication system of claim 1, wherein data is modulated onto said active channel using Quadrature Amplitude Modulation.

15. The communication system of claim 1, wherein data is modulated onto said active channel using Frequency Shift Keying.

16. The communication system of claim 1, wherein said active channel is frequency-division multiplexed with respect to a second active channel.

17. The communication system of claim 1, wherein said active channel is orthogonal frequency-division multiplexed with respect to a second active channel.

18. An apparatus, comprising:
means for storing active fragments;
means for storing active fragment flags;
a plurality of channel transmitters;
means for storing active channel flags; and
means for mapping said active fragments to said plurality of channel transmitters.

19. An apparatus, comprising:
means for storing active fragments;
means for storing active fragment flags;
a plurality of channel transmitters;
means for storing active channel flags; and
means for mapping said active fragments to said plurality of channel transmitters according to said active fragment flags and said active channel flags.

20. An apparatus, comprising:
means for storing active fragments;
means for storing active fragment flags;
a plurality of active channel transmitters;
means for storing active channel flags; and
means for mapping said active fragments to said plurality of channel transmitters according to said active fragment flags and said active channel flags such that as many active fragments as possible are mapped to said active channel transmitters and to map one or more of said active fragments to more than one of said active channel transmitters once all of said active fragments have been mapped to at least one active channel transmitter.

21. A method for sending fragments over multiple channels, comprising:
loading a plurality of fragments into active transmit buffers;
initializing an active fragment register by asserting bits corresponding to transmit buffers that have been loaded with fragments;
initializing an active channel register;
mapping said active transmit buffers to active channel transmitters;
transmitting to a destination node fragments stored in said active transmit buffers;
receiving an acknowledgement from said destination node, said acknowledgement indicating which fragments were successfully received by said destination node;
updating said active-channel register and said active-fragment register;
re-mapping said active transmit buffers to active channel transmitters; and re-transmitting to said destination node fragments that were not successfully received by said destination node during any transmission.

22. The method of claim 21, further comprising:
repeating the acts of receiving an acknowledgement, updating, re-mapping, and re-transmitting until all active buffers are inactive.

23. The method of claim 21, wherein said act of initializing said active channel register comprises asserting all bits of said active channel register that correspond to channels, thereby making all channels active.

24. The method of claim 21, wherein said act of initializing said active channel register comprises asserting all bits of said active channel register that correspond to channels which were good channels during a previous transmission.

25. A method for sending fragments over multiple channels, comprising:

receiving an acknowledgement from a destination node, said acknowledgement indicating which fragments were successfully received by said destination node during a previous transmission;

updating an active-channel register and an active-fragment register;

mapping active transmit buffers to active channel transmitters; and transmitting active fragments to said destination node.

26. The method of claim 25, wherein said act of mapping comprises mapping as many active fragments as possible to active channels and mapping one or more of said active fragments to more than one of said active channels once all of said active fragments have been mapped to at least one active channel.

* * * * *